United States Patent [19]

Eastmond et al.

[11] Patent Number: 5,355,242
[45] Date of Patent: Oct. 11, 1994

[54] RECEIVER FOR BINARY CODED WIRELESS OPTICAL DATA

[75] Inventors: Bruce C. Eastmond, Downers Grove; Rachid M. Alameh, Schaumburg; Kevin W. Jelley, LaGrange Park, all of Ill.

[73] Assignee: Motorola, Inc., Schaumburg, Ill.

[21] Appl. No.: 42,909

[22] Filed: Apr. 5, 1993

[51] Int. Cl.$^5$ .............................................. H04B 10/06
[52] U.S. Cl. .................................. 359/189; 250/214 A; 330/59
[58] Field of Search ................ 359/154, 157, 188, 189, 359/194; 250/214 A; 330/276.59, 308

[56] References Cited

U.S. PATENT DOCUMENTS

| | | | |
|---|---|---|---|
| 4,426,662 | 1/1984 | Skerlos et al. | 359/194 |
| 4,679,252 | 7/1987 | Holland | 359/194 |
| 5,012,202 | 4/1991 | Taylor | 359/194 |
| 5,239,402 | 8/1993 | Little, Jr. et al. | 359/194 |

FOREIGN PATENT DOCUMENTS

| | | | |
|---|---|---|---|
| 0372742 | 6/1990 | European Pat. Off. | 359/189 |
| 0100532 | 4/1990 | Japan | 359/189 |

Primary Examiner—Herbert Goldstein
Assistant Examiner—Kinfe-Michael Negash
Attorney, Agent, or Firm—Timothy W. Markison; Steven G. Parmelee

[57] ABSTRACT

A wireless binary coded optical data receiver receives the binary encoded data via a photodiode. The binary encoded data is then supplied to the primary winding of a transformer and thus coupled to the secondary winding of the transformer. The secondary winding is coupled to a transimpedance amplifier wherein the transimpedance amplifier buffers the received binary encoded data. The buffered binary encoded data is then amplitude limited by a limiting circuit.

15 Claims, 2 Drawing Sheets

RECEIVER FOR BINARY CODED WIRELESS OPTICAL DATA

FIELD OF THE INVENTION

This invention relates generally to optical data communication systems and, in particular, to receivers of wireless binary coded optical data.

BACKGROUND OF THE INVENTION

As is known, data signals may be transmitted by amplitude modulating an optical signal in response to the data. The optical signal is typically generated by a semiconductor laser or light-emitting diode, propagates through a guiding medium, such as fiber, or through space, and is directly detected by a semiconductor photodiode. The optical signals commonly employed for data transmission have a wavelength which is located in the infrared portion of the electromagnetic spectrum. An example of an optical fiber data communication system is the Fiber Distributed Data Interface (FDDI) which transmits a continuous stream of data at 125 Mbit/sec. Examples of wireless optical data communication systems include: the ubiquitous TV/VCR remote control, which transmits bursts of pulses at a low effective bit rate and typically requires orientation of the transmitter; the BICC Communications InfraLAN, which transmits IEEE 802.5 token-ring standard data at a 4 Mbit/second rate and requires orientation of both the transmitter and receiver; and the Photonics Corporation Infrared Transceiver for Mobile Computing, which transmits data packets at a 1 Mbit/sec rate without requiring orientation. Wireless optical data communication systems, unlike their fiber counterparts, must contend with the presence of ambient light which, when detected, generates a direct current (dc) signal which may inhibit reception. In addition, the received signal power range of wireless optical data signals is significantly greater than the signal power range of optical data signals guided through fiber, especially if the propagation path of the wireless signals involves reflections which diminish the signal amplitude.

Since the release of the IEEE 802.3 10BASE-T twisted-pair Ethernet standard, 10 Mbit/sec Ethernet has rapidly become the de facto standard for local communication among PCs (personal computers) and workstations located on office desktops. Portable computers are now available which include provisions for the Ethernet controller function and 10BASE-T wired network connectivity. In addition, operating systems and software that incorporate file sharing permits portable computer users to convene and work together on a common document or other task if a limited-range wireless network could be readily established to link two or more computers together without requiring infrastructure. The use of a common format for both wired and wireless data minimizes the hardware and software complexity of both the portable computer and the wireless access ports connected to the wired network.

While Ethernet offers many advantages, eavesdropping is possible if the PC's Ethernet connection is a typical radio frequency (RF) transceiver. A typical RF transceiver has a transmission range of up to half a mile. Thus an eavesdropping receiver could be up to half a mile away and still intercept the PC's transmission. Such an interception would be almost impossible to detect. Due to the high transmission rate of Ethernet (10 Mbit/second), prior art wireless optical data communication systems are not readily usable for Ethernet because the transmission rate is much slower.

As a result, a need exists for a sensitive optical receiver for binary coded wireless optical data in a packet format, such as Ethernet, which minimizes ambient light degradation, has a wide acceptance angle so as to minimize the need to point or aim the receiver in a particular direction, and has a relatively short transmission range.

DESCRIPTION OF A PREFERRED EMBODIMENT

Figure 1:
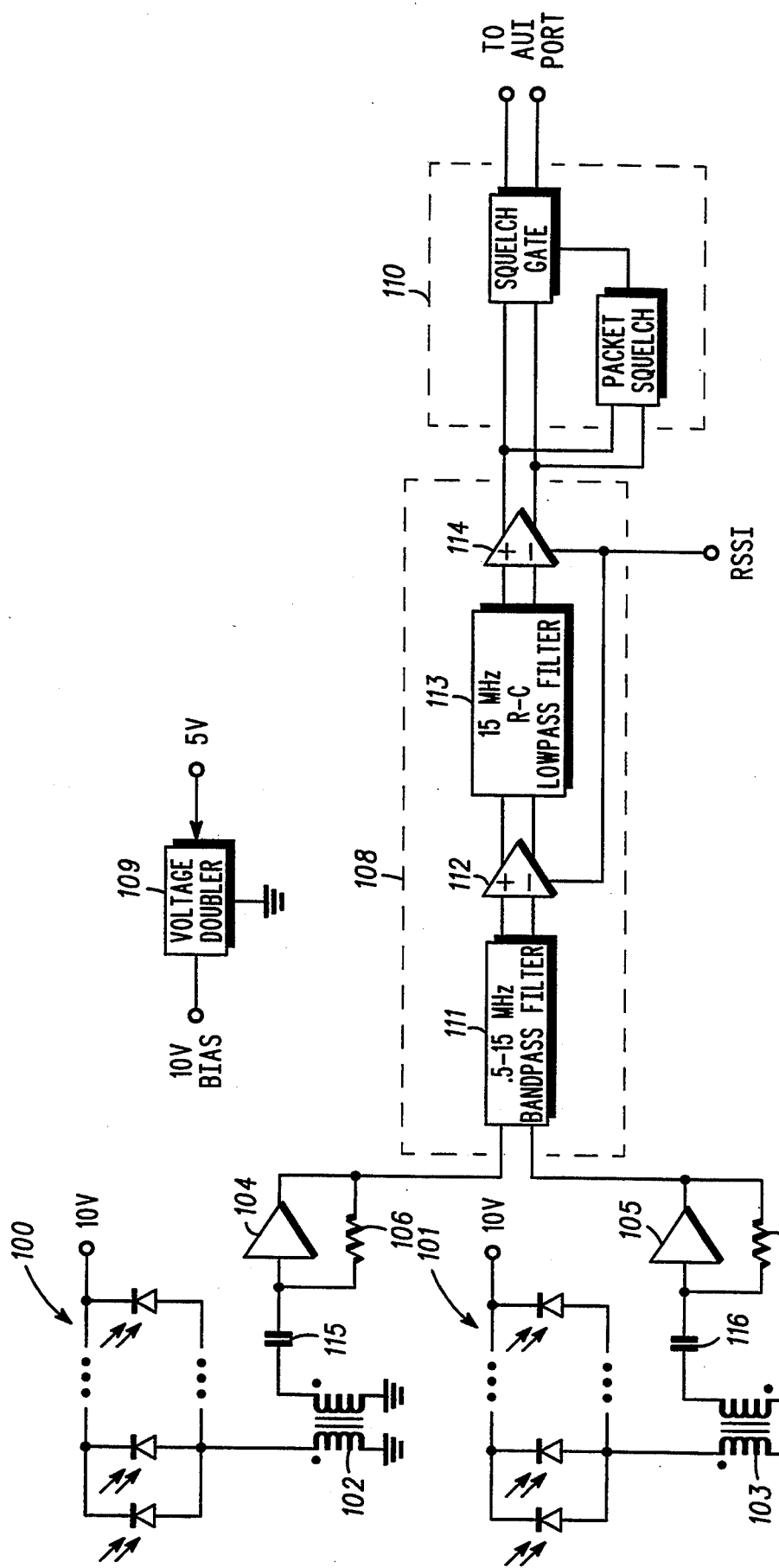
FIG. 1 illustrates a wireless optical receiver in accordance with the present invention.

FIG. 1 illustrates a receiver for high-speed binary encoded wireless optical data that comprises optical receiving means (100 and 101), first and second transformers (102 and 103), transimpedance amplifiers (104 and 105), feedback resistors (106 and 107), and limiting means (108). The optical receiving means (100 and 101) comprises one or more reversed-biased photodiodes, parallel-connected to form arrays. The arrays (100) and (101) may be reversed biased by a voltage multiplier (109). The first photodiode array (100) is connected to the primary winding of the first untuned transformer (102) and the second photodiode array (101) is connected to the primary winding of the second untuned transformer (103). An example of a transformer suitable for use with high-speed binary encoded data signals such as Ethernet is the Coilcraft LAX10T-100SM.

When light is incident on either array (100) or (101), a current is produced in the primary winding of the first or second untuned transformer (102) or (103), respectively, which has a mean value equal to the product of the light source irradiance at the surface of the array, the photodiode responsivity, the surface area of the array and the optical gain preceding the array. The light incident on the surface of photodiode arrays may include both the desired intensity-modulated infrared data signals as well as unmodulated ambient light due to daylight, interior lighting, etc. The direct current due to unmodulated ambient light sources is returned to ground while the binary encoded data signals are passed from the primary to the secondary winding of the first or second untuned transformers (102) and (103).

The secondary winding of the first untuned transformer (102) is coupled through capacitor (115) to transimpedance amplifier (104) having feedback resistor (106). In a similar way the secondary winding of the second untuned transformer (103) is coupled through capacitor (116) to transimpedance amplifier (105) having feedback resistor (107). The presence of feedback resistors (106 and 107) ensure that the transimpedance amplifiers have the necessary low input impedance, approximately 100 ohms, to provide proper impedance matching to the first and second untuned transformers and minimal frequency response degradation due to the photodiode array capacitance. The first and second untuned transformers (102) and (103) may be designed to have a limited low frequency response. Extended low frequency response is not necessary with binary encoded data signals such as Manchester-encoded data signals since the data signal spectrum has minimal energy at frequencies less than approximately 5% of the bit rate. It is advantageous to limit the low frequency response of the receiver in order to eliminate interference caused by ambient fluorescent lighting and minimize the time duration of the dc bias shifts in subsequent receiver stages associated with the detection of a data packet. The secondary windings of first and second untuned transformers (102) and (103) are reversed in phase to provide differential signal inputs to transimpedance amplifiers (104) and (105), respectively.

The limiting means (108) comprises a bandpass filter (111), amplifiers (112 and 114), and a low pass filter (113). The outputs of transimpedance amplifiers (104) and (105) are coupled through a balanced filter (111) to the input of amplifier (112). The balanced filter (111) may be a low-pass filter. If the binary encoded data signals are Ethernet, a filter such as the Coilcraft LAF10T-5B may be employed. Balanced filter (111) may include means for limiting the low frequency response, such as an R-C high-pass filter, if such a means is not incorporated in the design of transformers (102) and (103) as previously discussed. Amplifier (112) may have a bandwidth sufficient to pass the binary encoded data signal with acceptably low distortion and may have provisions to derive a received signal strength indication (RSSI). A suitable amplifier for Ethernet data signals is the Motorola MC13155.

An additional stage of R-C low-pass filtering (113) having a bandwidth sufficient to pass the binary encoded data signals with acceptably low distortion may be incorporated between the output of amplifier (112) and the input of limiting amplifier (114). Limiting amplifier (114) may have a bandwidth sufficient to symmetrically limit the amplitude of the binary encoded data signal and may have provisions to derive a received signal strength indication (RSSI). A suitable amplifier for Ethernet data signals is the Motorola MC13155. The output of limiting amplifier (114) consists of a binary encoded signal output which may be further processed by a packet squelch and squelch gate (110).

Figures 2, 2A:
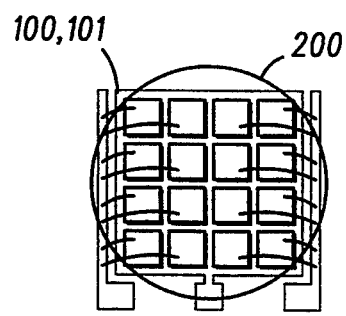
FIGS. 2A–2B illustrates light collection means for use with the wireless optical receiver of FIG. 1.
Figures 2, 2B:
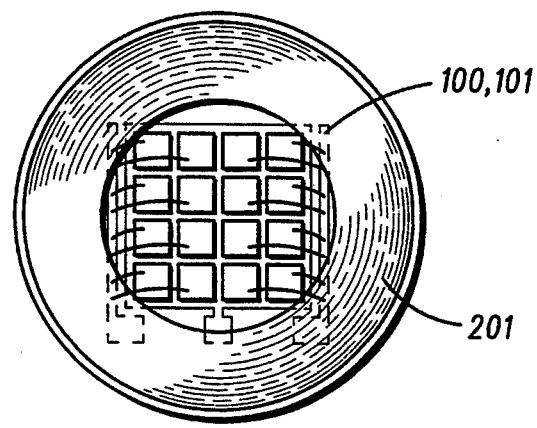
Figures 1, 2A:
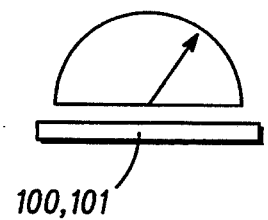
Figures 1, 2B:
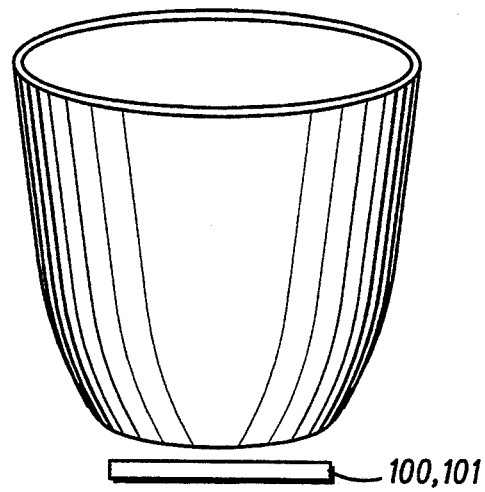

FIGS. 2A–2B illustrates two examples of light collectors which provide optical gain for the receiver of FIG. 1 over an acceptance angle wider than that of conventional thin convex or fresnel lenses. A hemispherical lens (200) may be optically coupled to photodiode arrays (100) and (101) to provide optical gain having a value equal to the square of the index of refraction of the lens material and an acceptance half-angle approaching ±90 degrees. A light cone or compound parabolic collector (CPC) (201) may also be optically coupled to photodiode arrays (100) and (101) to provide substantially uniform optical gain over the angle of acceptance. For the CPC, the optical gain may approach the limit $1/\sin^2 q_c$, where $q_c$ is the acceptance half-angle. The light collectors may advantageously be made from material such as Rohm and Haas Plexiglass molding resins 58004 or 58015 which blocks visible light but transmits infrared light. Note that with any type of optical collector mentioned, the transmission range is limited by walls, floors, and ceilings of conventional design.

As shown, the present invention provides a means for a receiver capable of receiving binary encoded wireless optical data. The present invention minimizes light degradation, has a wide acceptance angle minimizing the need to aim the receiver in a particular direction, and has minimal interference with other RF communication devices. Since coverage is confined to a room or office, eavesdropping and interference from nearby systems is also minimized.

We claim:

1. A receiver that receives binary coded optical data packets comprises:
   at least one photodiode that receives the binary coded optical data packets from a transmitting light source to produce received binary encoded data;
   at least one untuned transformer having at least a primary winding and a secondary winding, wherein the primary winding is operably coupled to the at least one photodiode such that the received binary encoded data is operably coupled from the primary winding to the secondary winding;
   at least one transimpedance amplifier operably coupled to the secondary winding, wherein the transimpedance amplifier buffers the received binary encoded data to produce buffered binary encoded data; and
   limiting means, operably coupled to the at least one transimpedance amplifier, for limiting amplitude of the buffered binary encoded data.

2. The receiver of claim 1 further comprises a second photodiode that receives the binary encoded optical data packets to produce second received binary encoded data.

3. The receiver of claim 2 further comprises a second untuned transformer having a primary winding and a secondary winding, wherein the secondary winding has reverse phase as that of the primary winding and wherein the primary winding is operably coupled to the second photodiode such that the second received binary encoded data is operably coupled to the secondary winding.

4. The receiver of claim 3 further comprises a second transimpedance amplifier that buffers the second received binary encode data from the secondary winding of the second untuned transformer to produce buffered second received binary encoded data, wherein the buffered second received binary encoded data is supplied to the limiting means.

5. In the receiver of claim 1, wherein the limiting means further comprises a band pass filter, operably connected to a first amplifier, and a low pass filter operably connected to said first amplifier, and a second amplifier connected to said low pass filter.

6. In the receiver of claim 1, the at least one photodiode further comprises a photodiode array to receive the binary encoded optical data packets.

7. The receiver of claim 1 further comprises a high pass filter operably coupled to the secondary winding.

8. A receiver that receives binary encoded optical data packets comprising:
   optical receiving means for receiving the binary encoded optical data packets and for producing received binary encoded data:
   a first untuned transformer having a primary winding, a secondary winding, and a predetermined frequency response, wherein the primary winding is operably coupled to the optical receiving means such that the received binary encoded data is coupled from the primary winding to the secondary winding;
   a transimpedance amplifier, operably coupled to the secondary winding, wherein the transimpedance amplifier buffers the received binary encoded data to produce buffered binary encoded data; and limiting means, operably coupled to the transimpedance amplifier, for limiting amplitude of the buffered binary encoded data.

9. In the receiver of claim 8, the optical receiving means further functions as a light collector with diode array, wherein the light collector with diode array is operably coupled to the first untuned transformer, wherein the light collector with diode array receives the binary encoded optical data packets to produce first received binary encoded data.

10. In the receiver of claim 8, the optical receiving means further functions as a photodiode, wherein the photodiode is operably coupled to the first untuned transformer, wherein the photodiode receives the binary encoded optical data packets to produce first received binary encoded data.

11. In the receiver of claim 8, the optical receiving means further functions as a first set of photodiodes and a second set of photodiodes, wherein the first set of photodiodes is operably coupled to the first untuned transformer, wherein the first set of photodiodes receives the binary encoded optical data packets to produce first received binary encoded data and wherein the second set of photodiodes receives the binary encoded optical data packets to produce second received binary encoded data.

12. In tile receiver of claim 8, wherein the limiting means further comprises a low pass filter, operably connected between first and second amplifiers, and a band pass filter operably connected to said first amplifier.

13. The receiver of claim 11 further comprises a second untuned transformer having a primary winding and a secondary winding, wherein the secondary winding has reverse phase as that of the primary winding and wherein the primary winding is operably coupled to the second set of photodiodes such that the second received binary encoded data is operably coupled to the secondary winding.

14. The receiver of claim 13 further comprises a second transimpedance amplifier that buffers the second received binary encoded data from the secondary winding of the second untuned transformer to produce buffered second received binary encoded data, wherein the buffered second received binary encoded data is supplied to the limiting means.

15. An improved personal computer that includes a binary encoded data detector coupled to a receiver that receives binary coded optical data packets, wherein the improvement comprises:

at least one photodiode that receives the binary coded optical data packets from a transmitting light source to produce received binary encoded data;

at least one untuned transformer having at least a primary winding and a secondary winding, wherein the primary winding is operably coupled to the at least one photodiode such that the received binary encoded data is operably coupled from the primary winding to the secondary winding;

at least one transimpedance amplifier, operably coupled to the secondary winding, wherein the transimpedance amplifier buffers the received binary encoded data to produce buffered binary encoded data; and limiting means, operably coupled to the at least one transimpedance amplifier, for limiting amplitude of the buffered binary encoded data.

* * * * *

UNITED STATES PATENT AND TRADEMARK OFFICE
CERTIFICATE OF CORRECTION

PATENT NO. : 5,355,242

DATED : October 11, 1994

INVENTOR(S) : Bruce C. Eastmond, et al.

It is certified that error appears in the above-identified patent and that said Letters Patent is hereby corrected as shown below:

In The Claims:

Column 5 Line 27, "tile" should be --the--.

Signed and Sealed this

Sixth Day of December, 1994

Attest:

BRUCE LEHMAN

*Attesting Officer*     *Commissioner of Patents and Trademarks*